US010051107B1

(12) United States Patent
Prasad et al.

(10) Patent No.: US 10,051,107 B1
(45) Date of Patent: Aug. 14, 2018

(54) OPPORTUNISTIC TIMING OF DEVICE NOTIFICATIONS

(71) Applicant: Microsoft Technology Licensing, LLC, Redmond, WA (US)

(72) Inventors: Richa Prasad, Seattle, WA (US); Michael Patten, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/460,721

(22) Filed: Mar. 16, 2017

(51) Int. Cl.
  *G06F 15/16* (2006.01)
  *H04M 1/725* (2006.01)
  *H04W 68/00* (2009.01)

(52) U.S. Cl.
  CPC ... *H04M 1/72566* (2013.01); *H04M 1/72597* (2013.01); *H04W 68/005* (2013.01)

(58) Field of Classification Search
  CPC ......... H04W 4/02; H04W 8/245; H04M 3/56; H04M 11/066
  USPC ........... 455/414.1, 416, 419, 420; 379/93.09, 379/412
  See application file for complete search history.

(56) References Cited

U.S. PATENT DOCUMENTS

| 2002/0057285 | A1 | 5/2002 | Nicholas, III | |
| 2004/0228463 | A1* | 11/2004 | Sauvage | H04M 3/56 379/202.01 |
| 2014/0235282 | A1 | 8/2014 | Kansal et al. | |

FOREIGN PATENT DOCUMENTS

WO 2011067675 A2 6/2011

OTHER PUBLICATIONS

Int. Search Report/Written Opinion cited in PCT Application No. PCT/US2018/021637 dated Jun. 11, 2018, 13 pgs.

* cited by examiner

*Primary Examiner* — Sam Bhattacharya
(74) *Attorney, Agent, or Firm* — Cooper Legal Group, LLC

(57) ABSTRACT

Many devices are configured to present notifications to a user in an environment, such as mobile phones that ring or buzz to notify the user of an incoming call, and navigation devices that present verbal instructions to a driver of a vehicle. Many such devices present such audio notifications when information with potential relevance to the user is initially identified, but such techniques may interrupt an activity of the user, such as a conversation. Instead, a device may monitor an activity of the user within an environment to detect a notification opportunity when notifications may be presented to the user without interrupting the activity (e.g., a break in the conversation, or a gap of idle time between a first scheduled appointment and a second scheduled appointment). The device may present notifications of pertinent information to the user during the notification opportunities rather than interrupting the activity of the user.

20 Claims, 7 Drawing Sheets

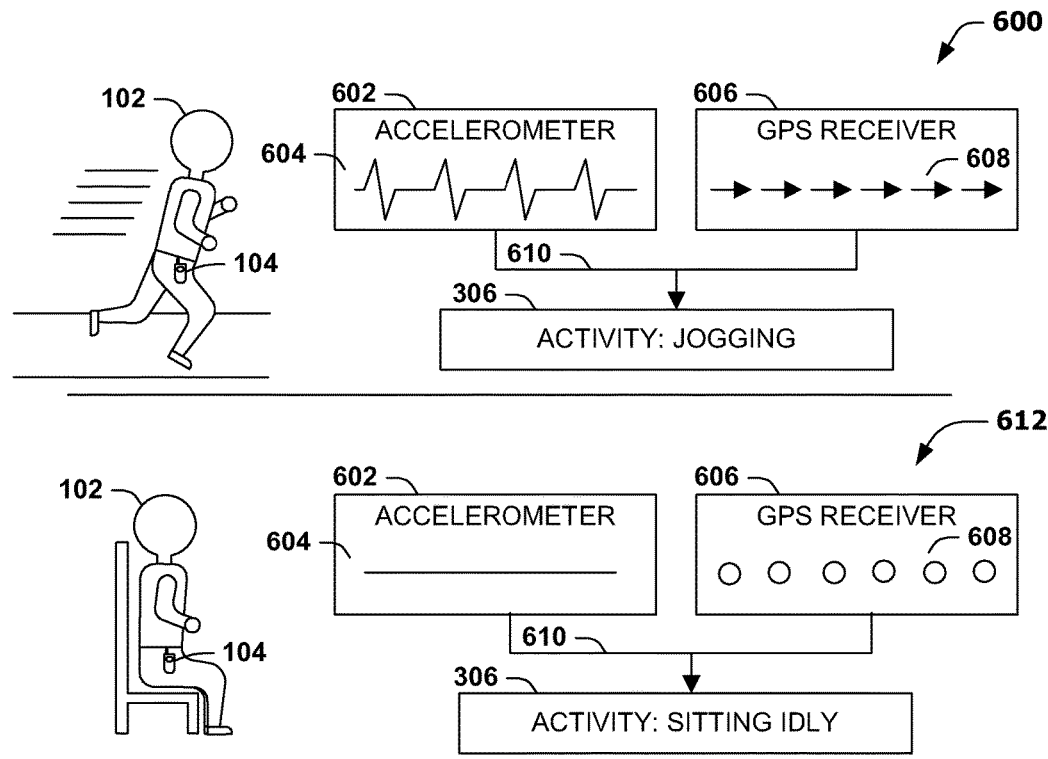
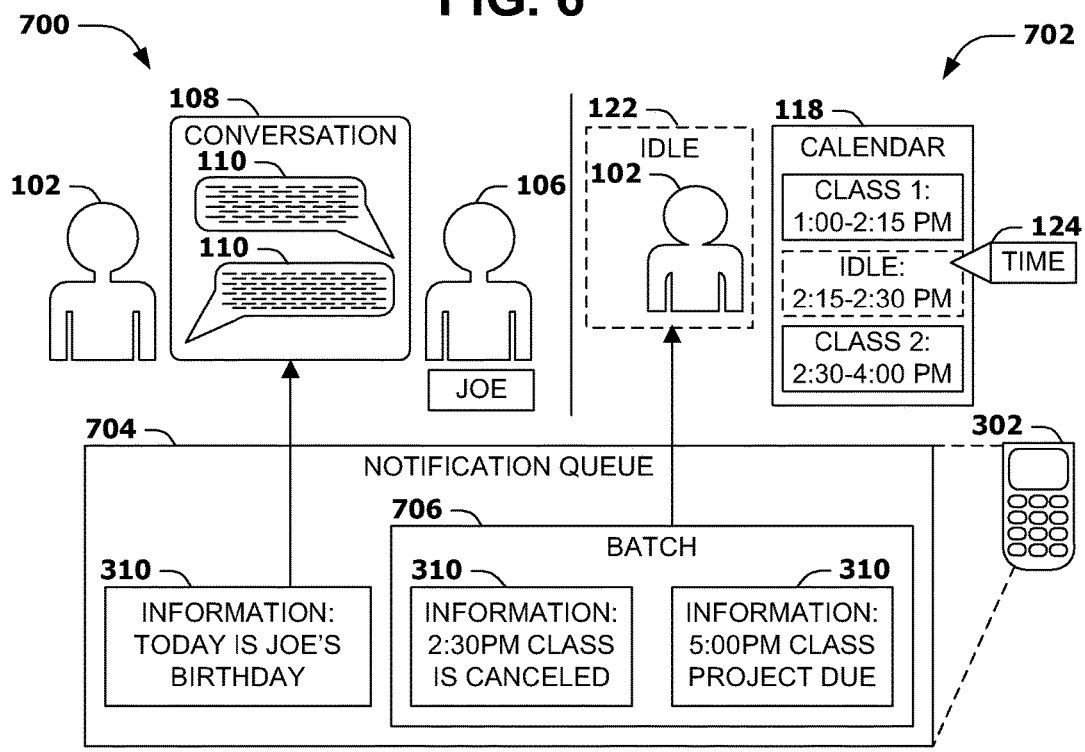

OPPORTUNISTIC TIMING OF DEVICE NOTIFICATIONS

BACKGROUND

Within the field of human/computer interaction, many devices are configured to present notifications of information to a user that the user may find notable and/or timely. As a first example, upon receiving an incoming call or a message, a device may ring, flash, or buzz to notify the user of the communication and to enable the user to respond in a prompt manner. As a second example, a device may monitor a calendar of a user for an upcoming appointment, and may present a reminder when the appointment is imminent, such as a reminder presented 15 minutes in advance of the appointment. As a third example, a device may enable a user to follow a route to a destination by presenting a series of navigation notifications (e.g., "turn right in 0.5 kilometers"). As a fourth example, a device may utilize a geofencing technique to associate a location with a message, and may present a notification of the message to the user upon the user's arrival at the location.

In many such scenarios, notifications may be presented to the user in a prompt and timely manner, but may be presented at an inconvenient time that interrupts an activity of the user. For example, the user may be in the midst of a conversation with another individual, and the presentation of a notification may interrupt the conversation and/or distract the user by interjecting a ringtone, flashing, buzzing, or other notification modality. Although the user may appreciate some interrupting notifications such as an emergency call or the timely presentation of an urgent reminder, other instances of interruption may serve to frustrate the user.

In view of such frustration, many devices provide a variety of techniques for reducing the interrupting effect of notifications. As a first example, while engaged in a conversation, the user may set the device on mute, select a more subtle interaction modality (e.g., buzzing rather than ringing), disconnect the device from the communication channel for receiving notifications, or entirely turn off the device. As a second example, the device may provide a mechanism for canceling or delaying the presentation of a particular notification, such as refusing an incoming call and redirecting the caller to voicemail. As a third example, the user may select a notification mode of the device such as "Do Not Disturb," which may selectively present some notifications that are identified as urgent or higher-priority (e.g., messages from close contacts), while delaying the presentation of notifications that are deemed not urgent or lower-priority (e.g., messages from acquaintances or unknown senders).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While many device configuration properties may be presented to and utilized by a user to reduce the interruption effect of the notifications, such techniques depend upon the configuration of the device by the user. Additionally, these techniques may exhibit false positives and/or false negatives in the triaging of messages. For example, a "Do Not Disturb" mode that only permits incoming messages from close contacts may undesirably transmit a low-priority message from a close contact (e.g., a message from a family member asking about a grocery list), while undesirably restricting a high-priority message from a more distant contact (e.g., an unknown caller may be contacting the user about having located his or her lost wallet). As another example, the user may forget to activate a mute or "Do Not Disturb" mode and may therefore inadvertently enable the phone to interrupt an inopportune moment (e.g., ringing in the middle of a class lecture). Conversely, the user may forget to deactivate the mute or "Do Not Disturb" mode after leaving class, and may therefore inadvertently miss incoming communications that the user is capable of receiving without interruption. In these ways, such techniques that depend upon the user's selection of a device mode to alter the presentation of notifications may seem "high-maintenance" (e.g., depending upon frequent interaction of the user to select the device mode) and/or inaccurate due to a high degree of false positives and/or false negatives.

Furthermore, techniques of managing device notifications that depend upon the user's selection of a device mode may fail to adapt the selection and presentation of notifications to the context of the user. As a first such example, a geofencing application may present a notification to a user to pick up particular groceries at a store while the user is driving past the store. As a second such example, the device may present a notification of an incoming message from a classmate in the user's class while the user is attending to a family matter or an internship, and is not in a proper opportunity to consider class-related notifications. As a third such example, the device may present a notification to the user that depends upon the user's interaction, but may be presented while the user is incapable of interacting with the device, such as while the user is exercising or operating a vehicle. Such notifications may represent an undesirable interruption of the current activity of the user with contextually irrelevant information.

Presented herein are techniques for adapting the timing of presented notifications to achieve a less obtrusive and more contextually appropriate interaction, and that may reduce both false positives, false negatives, and/or overly coarse granularity in the selectivity of such notifications. In accordance with these techniques, a device may monitor an activity of a user within an environment, and identify information that pertains to the activity of the user within the environment. The device may identify, within the activity of the user, a notification opportunity to notify the user of the information without interrupting the activity of the user; and during the notification opportunity, the device may present to the user, through the notification output, a notification of the information. By choosing the timing of the presentation of notifications according to a notification opportunity that does not interrupt the user's activity, and selecting information that pertains to such activity within the environment of the user, the device may provide comparatively low-maintenance, contextually appropriate, and non-interrupting notifications in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 6 is an illustration of an example scenario featuring techniques for determining an activity of the user in order to identify a notification opportunity for presenting notifications, in accordance with the techniques presented herein.

FIG. 7 is an illustration of a first example scenario featuring techniques for choosing among a set of notifications to present at a notification opportunity, in accordance with the techniques presented herein.

DETAILED DESCRIPTION

Figure 1:
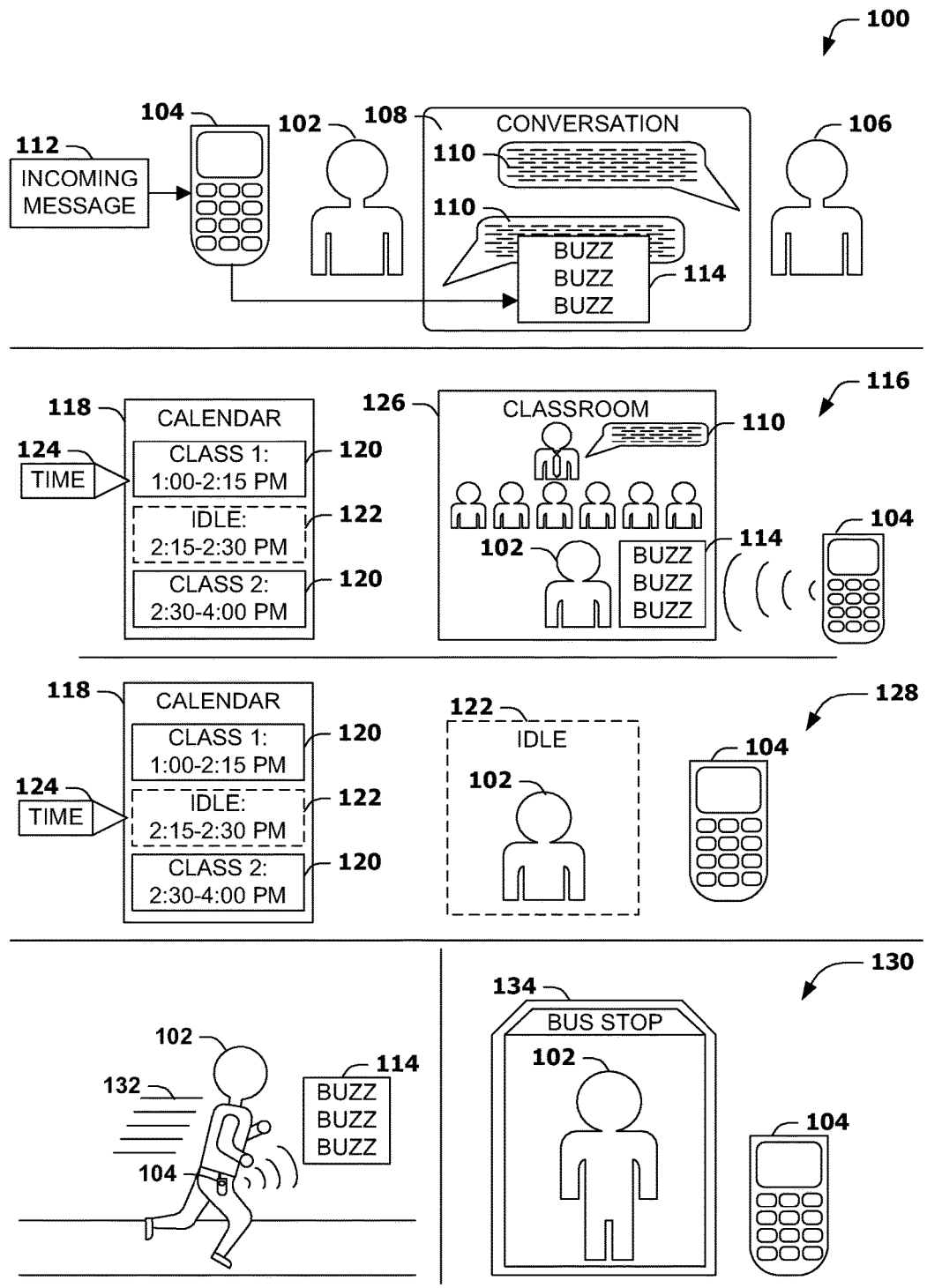
FIG. 1 is an illustration of some example scenarios featuring a presentation of notifications of information to a user of a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of a set of example scenarios (100, 116, 128, and 130) in which a device 104 presents notifications to a user 102. In these example scenarios, the device 104 comprises a mobile phone that receives an incoming message 112 for presentation to the user 102, and that presents a notification 114 to alert the user 102 as to the receipt of the incoming message 112. The notification 114 is presented to the user 102 in a manner that may attract the attention of the user 102, such as ringing, flashing, or vibrating, in order to present a timely notification of the incoming message 112 to the user 102, which may enable the user 102 to accept the incoming message 112, to reply promptly, and/or to act on the incoming message 112 in a timely manner.

Devices 104 are currently capable of presenting such notifications 114 based upon a variety of conditions. As a first such example, the device 104 may monitor the calendar 118 of the user 102 to present a reminder notification 114 of an upcoming appointment, such as a reminder presented 15 minutes in advance of the appointment. As a second example, a navigation device 104 may provide navigational instructions to a user 102 to assist in navigating a route to a destination, and may therefore present a series of navigation notifications (e.g., "turn right in 0.5 kilometers") to the user 102 upon reaching designated locations along the route. As a third example, a device 104 may utilize a geofencing technique to associate a location with a particular notification 114, and may present the notification 114 to the user 102 upon the user's arrival at the location. Devices 104 currently present a variety of such notification mechanisms for keeping the user 102 informed of a rich set of information.

However, in each example scenario of FIG. 1, the presentation of the notification 114 of the incoming message 112 also presents some undesirable aspects of the interaction between the device 104 and the user 102.

In a first example scenario 100, the user 102 is participating in a conversation 108 with an individual 106, wherein the user 102 and the individual 106 take turns verbalizing a series of expressions 110. The presentation of the notification 114 of the incoming message 114 by the device 104 may overlap the turn-taking series of expressions 110, and may therefore interrupt the conversation 108 between the user 102 and the individual 106.

In a second example scenario 116, the device 104 may present a notification 114 of an incoming message 112 at a time 124 in the user's daily schedule (as recorded in a calendar 118) when the user 102 is attending a class 120 in a classroom 126. The notification 114 may distract the user 102, the instructor, and/or other individuals in the classroom 126, and may therefore impose a significant source of irritation and/or embarrassment to the user 102 and others in the classroom 126. Moreover, in a subsequent scenario 128 briefly following the second example scenario 116, the user 102 may be idle 112 for a period of time 124 during which the user 102 is capable of receiving the notification 114 of the incoming message 112 without irritation and/or embarrassment.

In a third example scenario 130, the device 104 may present the notification 114 of the incoming message 112 while the user 102 is engaged in an activity that precludes receipt of the notification 114, such as while the user 102 is running 132 to catch a bus or a train. The presentation of the notification 114 may irritate the user 102 due to the user's inability to act upon the notification 114. Alternatively, the user 102 may fail to notice the notification 114 while running 132. Moreover, the device 104 may fail to notify the user 102 of the incoming message 112 at a later time 124 when the user 102 is available to receive the notification 114, such as while waiting at a bus stop 134. Regardless of whether the user 102 received the notification 114 while running 132 but forgot the notification 114 before arriving at the bus stop 134 or whether the user 102 failed to receive the notification 114, the device 104 may contribute to the user's failure to receive, respond to, and/or act upon the message 112 in a timely manner due to the failed notification 114 that was presented in an untimely manner while the user 102 was running.

It may be appreciated that a shared aspect of the scenarios presented above is the configuration of the device 104 to present the notification 114 to the user 102 promptly upon receiving the incoming message 112—and irrespective of the context of the user 102, such as the user's current activity and/or environment, and the impact of the notification 114 on such activity and/or environment. The device 104 simply presents the notification 114 irrespective of whether or not the notification 114 interrupts a current activity of the user 102 and/or any nexus between the informational content of the notification 114 and the user's activity. In some instances, such interruption may be desirable to the user 102, such as where the incoming message 112 is a notification of an emergency or an urgent message that justifies the interruption. However, in many instances, the nature of the incoming message 112 may not warrant the interruption of the conversation 108 with the individual 106, and may therefore impose a distraction and/or irritation upon the user 102. Additionally, in many such scenarios, the notification 114 may be presented at a time 124 when the notification 114 is not contextually relevant to the user 102, and/or when the user 102 is not fully capable of receiving, replying to, and/or acting upon the incoming message 112, due to the user's current activity and/or environment.

In order to mitigate the interruption and/or irrelevance aspects of presented notifications 114, many devices 104 that are capable of providing notifications 114 also provide a variety of configuration properties that the user 102 may select to reduce the interruption effect of the notifications 114 and/or missing notifications 114 due to the activity of the user 102. However, the available options may each entail a variety of disadvantages that only partially alleviate the device 104 of such undesirable side-effects, and/or that create new problems for the user 102.

As a first such example, a device 104 may feature a "mute" mode that substitutes highly audible ringing with a more subtle interaction modality, such as flashing a display or vibrating a haptic device. The device 104 may also enable the user 102 to disconnect from the communication channel for receiving incoming messages 112, or and/or to turn off the device 104 entirely to block any and all notifications 114 while the user 102 is in an uninterruptible interaction. As a second example, the device 104 may provide a "Do Not Disturb" mode that only permits notifications 114 of incoming messages 112 from close contacts.

However, these options may exhibit an undesirably poor accuracy and/or granularity as a mechanism for triaging notifications 114. As a first such example, the user 102 may forget to deactivate or disconnect the device 104, and/or to activate a mute or "Do Not Disturb" mode of the device 104, and may therefore inadvertently cause the device 104 to present a notification 114 at an inopportune moment (e.g., ringing in the middle of a class lecture). Conversely, the user 102 may forget to turn on and/or reconnect the device 104 on, and/or to disable the mute setting or "Do Not Disturb" mode, when the user 102 intends to be reachable again. The user 102 may therefore inadvertently miss notifications 114 of incoming messages 112 that the user 102 is capable of receiving without interruption.

As a second such example, a "Do Not Disturb" mode may undesirably transmit a low-priority incoming message 112 from a close contact (e.g., a notification 114 of an incoming message 112 from a family member asking about a grocery list), while undesirably blocking a notification 114 of a high-priority incoming message 112 from a more distant contact (e.g., an unknown caller may be contacting the user 102 about having located his or her lost wallet). These disadvantages may arise from the dependency of such techniques upon the user's selection of the device mode of the device 104 to alter the presentation of notifications 114, which may appear "high-maintenance" to the user 102 (e.g., depending upon frequent interaction of the user 102 to select the device mode of the device 104 throughout the day), and/or inaccurate due to a high degree of false positives and/or false negatives in the selection and presentation of notifications 114.

As a third such example, device configuration techniques for managing notifications 114 that depend upon the selection of a device mode of the device 104 by the user 102 may fail to adapt the selection and presentation of notifications 114 according to the context of the user 102. As a first such example, a geofencing application may present a notification to a user 102 to pick up particular groceries at a store while the user 102 is merely driving past the store to another destination, and which is therefore immaterial to the current context of the user 102. As a second such example, the device 104 may present a notification of an incoming message 112 from a classmate in the user's class 120 while the user 102 is attending to a family matter or an internship, and is not in a proper opportunity to consider class-related messages 112. As a third such example, the device 104 may present a notification 114 to the user 102 that depends upon the user's interaction, but may be presented while the user 102 is incapable of interacting with the device 104, such as while the user 102 is exercising or operating a vehicle. Such notifications 114 may therefore represent an undesirable interruption of the current activity of the user 102 with contextually irrelevant information. In these and other ways, the notification techniques presented in the example scenarios of FIG. 1 illustrate a variety of limitations and/or disadvantages with such presentation of notifications 114.

B. Presented Techniques

Figure 2:
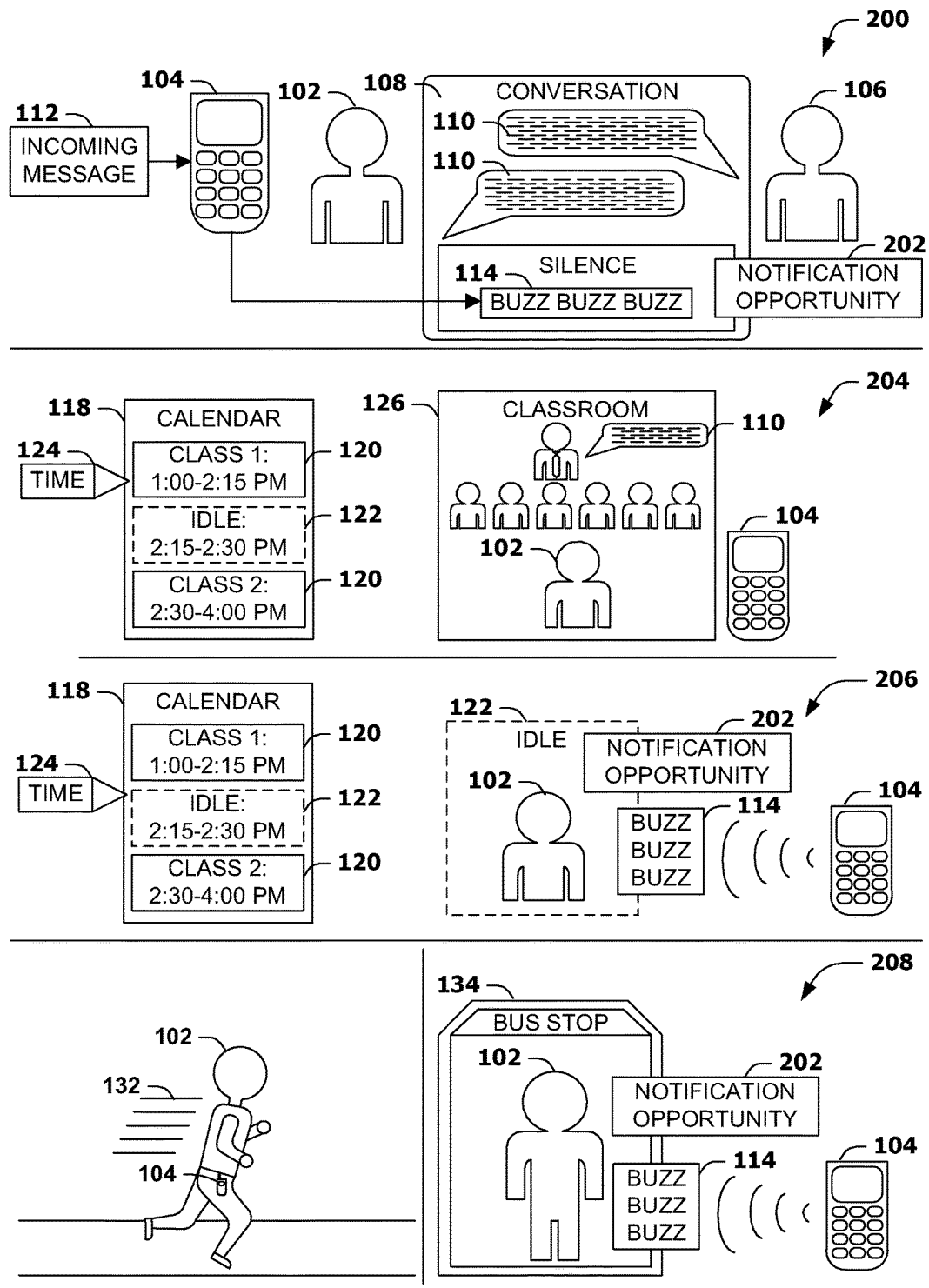
FIG. 2 is an illustration of some example scenarios featuring a presentation of notifications of information to a user of a device, in accordance with the techniques presented herein.

FIG. 2 is an illustration of a set of example scenarios 200 featuring a set of techniques for adapting a device 104 to present notifications 114 in accordance with the techniques presented herein.

In a first example scenario 200, the user 102 is again engaged in a conversation 108 with an individual 106 involving a series of expressions 110 when the device 104 receives an incoming message 112. Rather than presenting the incoming message 112 promptly, the device 104 may monitor the conversation 108 to detect a period of silence when the expressions 110 of the user 102 and the individual 106 have lapsed. For example, the device 104 may apply a speech recognition technique, and may identify, as a lag in the conversation 108, a period of at least ten seconds in which no vocalization is detected from either the user 102 or the individual 106. This silence may be interpreted as a notification opportunity 202 in which the notification 114 of the incoming message 112 without overlapping and therefore interrupting the expressions 110 of the user 102 and/or the individual 106.

In a second example scenario 200, the user 102 is attention a lecture of a class 120 in a classroom 126 when the device 104 receives an incoming message 112. Rather than promptly presenting a notification 114 of the incoming message 112, the device 104 may examine the calendar 118 of the user 102, and, by comparison with the current time 124, may infer that the user 102 is attending a class 120 that the user 102 may prefer not to be interrupted by the notification 114. Moreover, the device 104 may further identify, from the calendar 118, an imminent block of time when the user 102 may be idle 122 between the current class 120 and a next class 120, during which the presentation of the notification 114 is less likely to interrupt a class 120 and/or during which the user 102 is more likely to be capable of receiving the notification 114. The device 104 may therefore defer the notification 114 until a subsequent scenario 206 at a current time 124 when the calendar 118 indicates that the user 102 may be idle 122. The device 104 may interpret this block of time 124 on the calendar 118 of the user 102 as a notification opportunity 202, and may present the notification 114 of the incoming message 112 to the user 102 when the time 124 of the notification opportunity 202 arrives.

In a third example scenario 208, the device 104 may receive an incoming message 112 while the user 102 is engaged in an activity such as running 132 (e.g., for aerobic exercise, and/or to catch a bus or train). The device 104 may determine that the activity of the user 102 represents an inopportune time to present notifications 114 of messages 112 that the user 102 may find irritating, may not be capable of receiving and/or acting upon, and/or may forget by the conclusion of the activity. Instead, the device 104 may continue to monitor the activity of the user 102 until detecting an idle moment 122, such as when the user 102 is waiting idly at a bus stop 134, and may therefore identify this period of idleness 122 as a notification opportunity 202, during which the device 104 may present the notification 114 of the incoming message 112 to the user 102.

In each such scenarios, the device 104 monitors an activity of the user 102 within an environment (e.g., the conversation 108 between the user 102 and the individual 106; the attendance of the user 102 at a class 102 in a classroom 126, and/or during a period of idleness 122, as indicated by the calendar 118 of the user 102; and/or the activities performed by the user 102). The device 104 identifies information that pertains to the activity of the user 102 within the environment, such as the receipt of an incoming message 112 that may pertain to the current activity of the user 102, and/or that may be presented to the user 102 as a notification 114 that is compatible with the activity and/or environment of the user 102. The device 104 therefore identifies, within the activity of the user 102, a notification opportunity 202 to notify the user 102 of the information without interrupting the activity of the user 102, and presents the notification 114 of the information to the user 102 through the notification output during the notification opportunity 202. In this manner, the device 104 presents notifications 114 of information to the user 102 in an opportunistic manner that is likely to reduce the interruption of the user's activities and/or the disruption of the environment, in accordance with the techniques presented herein.

C. Technical Effects

Various uses of the techniques presented herein may result in a variety of technical effects.

A first technical effect that may be achievable with the techniques presented herein involves the configuration of a device 104 to adapt the presentation of notifications 114 during a notification opportunity 202 that is less likely to interrupt the activity of the user 102 and/or disrupt an environment of the user 102. The opportunistic timing of the presentation of notifications 114 may serve to promote the timely presentation of information to the user 102, and/or reduce the irritation and/or embarrassment of the user 102 that may be caused by the untimely and/or interrupting presentation of notifications 114. These instances may reflect "false positives," where the user 102 is presented with a notification 114 at a time 124 when the user 102 would desirably not receive notifications 114, either in general or for this particular type of information. The use of the techniques presented herein may diminish such "false positives," e.g., by selectively refraining from presenting notifications 114 at inopportune times 132, thereby reducing the irritation and/or embarrassment of the user 102 due to untimely notifications.

A second technical effect that may be achievable with the techniques involves presenting notifications 114 that are more likely to be received by the user 102. As a first such example, notifications 114 may otherwise be presented while the user 102 is performing an activity that distracts the attention of the user 102 from the device 104 and the notification 114, such as running 132. If the device 104 believes that it has issued the notification 114 to the user 102, and yet the user 102 has not received the notification 114, then the device 104 may have no cause to present the same notification 114 to the user 102 at a later time 132 when the user 102 is more likely to notice the notification 114. As a second such example, the user 102 may forget about a notification 114 of an incoming message 112 that was received as an interruption of a conversation 108, and if the device 104 does not repeat the notification 114 at a later time 124, the user 102 may fail to receive and/or respond to the incoming message 112. As a third such example, the user 102 may have temporarily activated a notification mode of the device 104 that reduces the presentation of notifications 114, such as a "Do Not Disturb" mode or a disconnection from a wireless communication channel, and may neglect to turn off the notification mode at a later time to receive notifications 114. Accordingly, the device 104 may refrain from presenting some or all notifications 114 to the user 102, thereby causing a delay or even a failure of the user 102 to receive the notifications 114. Such instances may represent a "false negative" in the presentation of notifications 114 that the use of the techniques presented herein may diminish, e.g., by selectively presenting notifications 114 in an opportunistic manner that promotes the receipt of the notifications 114 by the user 102.

A third technical effect that may be achievable with the techniques presented herein involves the selectivity of the notifications 114 presented by the device 104 to the user 102. By monitoring the activities of the user 102 within an environment, a device 104 may, in addition to identifying and choosing the notification opportunity 202 of the notifications 114, select among a set of notifications 114 to present to the user 102 in a more contextually appropriate manner, such as selecting notifications 114 of information that pertain to the activity of the user 102 within the environment. For example, while the user 102 is between classes 120 according to a calendar 118, the device 104 may selectively present notifications 114 of information related to the user's academic pursuits; and while the user 102 is between meetings in a professional role, the device 104 may selectively present notifications 114 of information related to the user's profession. Such techniques may also promote the user's privacy, e.g., by presenting notifications 114 of private messages to the user 102 only when the activity and/or environment of the user 102 are suitable for receiving private information, such as while the user 102 is home and/or alone, and refraining from presenting such notifications 114 while in public and/or in the company of other individuals 106. The use of the techniques presented herein may diminish such irritating and/or distracting presentations of immaterial or contextually inappropriate notifications 114, e.g., by selectively refraining from presenting notifications 114 that do not relate to the activity of the user 102 within the environment. Many such technical effects may be exhibited by various embodiments of the techniques presented herein.

D. Example Embodiments

Figure 3:
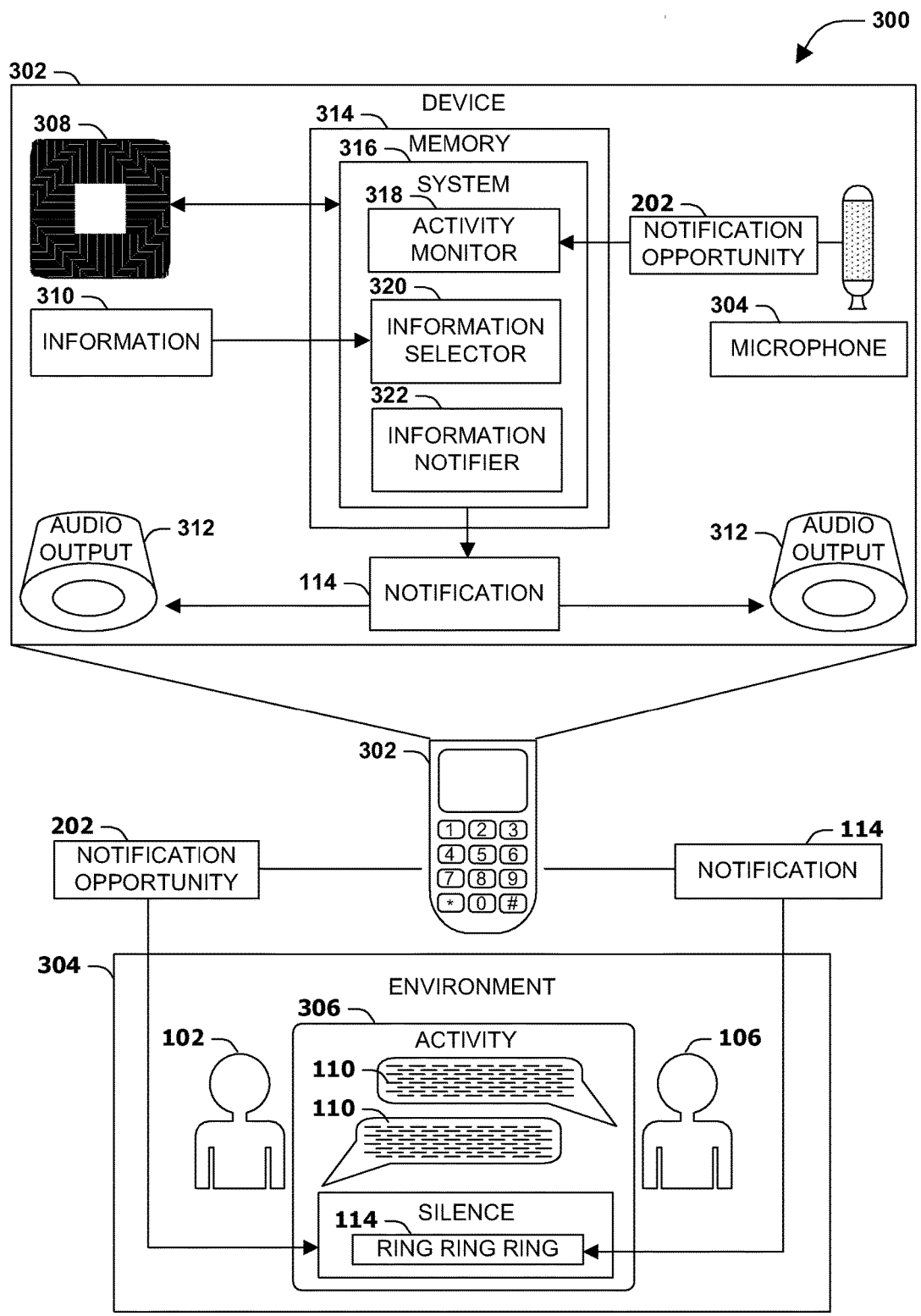
FIG. 3 is an illustration of an example device and/or system that presents notifications to a user, in accordance with the techniques presented herein.

FIG. 3 is an illustration of an example scenario 300 featuring some various embodiments of the techniques presented herein. In this example scenario 300, a device 302 such as a mobile phone presents a notification 114 of information 310 to a user 102 performing an activity 306 in an environment 304, such as engaging in a conversation with another individual 106 at a particular location, such as at home, in public, or in the user's office. In accordance with the techniques presented herein, the device 302 selectively presents the notification 114 in an opportunistic manner such as the following.

The example device 302 in the example scenario 300 of FIG. 3 comprises a microphone 314, a pair of audio outputs 312 that jointly operate as a notification output, a processor 308, and a memory 314. The memory 314 of the device 314 comprises instructions that, when executed by the processor 304, provide an example system 316 that causes the device 302 to operate in accordance with the techniques presented herein. In this example scenario 300, the example system 316 comprises an activity monitor 318 that monitors the activity 306 of the user 102 within the environment 304. The example system 316 further comprises an information selector 320 that to identifies information 310 that pertains to the activity 306 of the user 102 within the environment 304, such as identifying information 310 that pertains to the user 102, the individual 106, the expressions 110 within the conversation comprising the activity 306, and/or the environment within which the activity 306 occurs. The example system 316 further comprise an information notifier 322 that identifies, within the activity 306 of the user 102, a notification opportunity 202 to notify the user 102 of the information 310 without interrupting the activity 306 of the user 102, such as a period of silence arising within the conversation between the user 102 and the individual 106. The information notifier 322 further presents to the user 102, during the notification opportunity 202 and through the audio output 312, a notification 114 of the information 310. In this manner, the example device 302 and/or the example system 316 in the example scenario 300 of FIG. 3 notify the user 102 in an opportunistic manner in accordance with the techniques presented herein.

Figure 4:
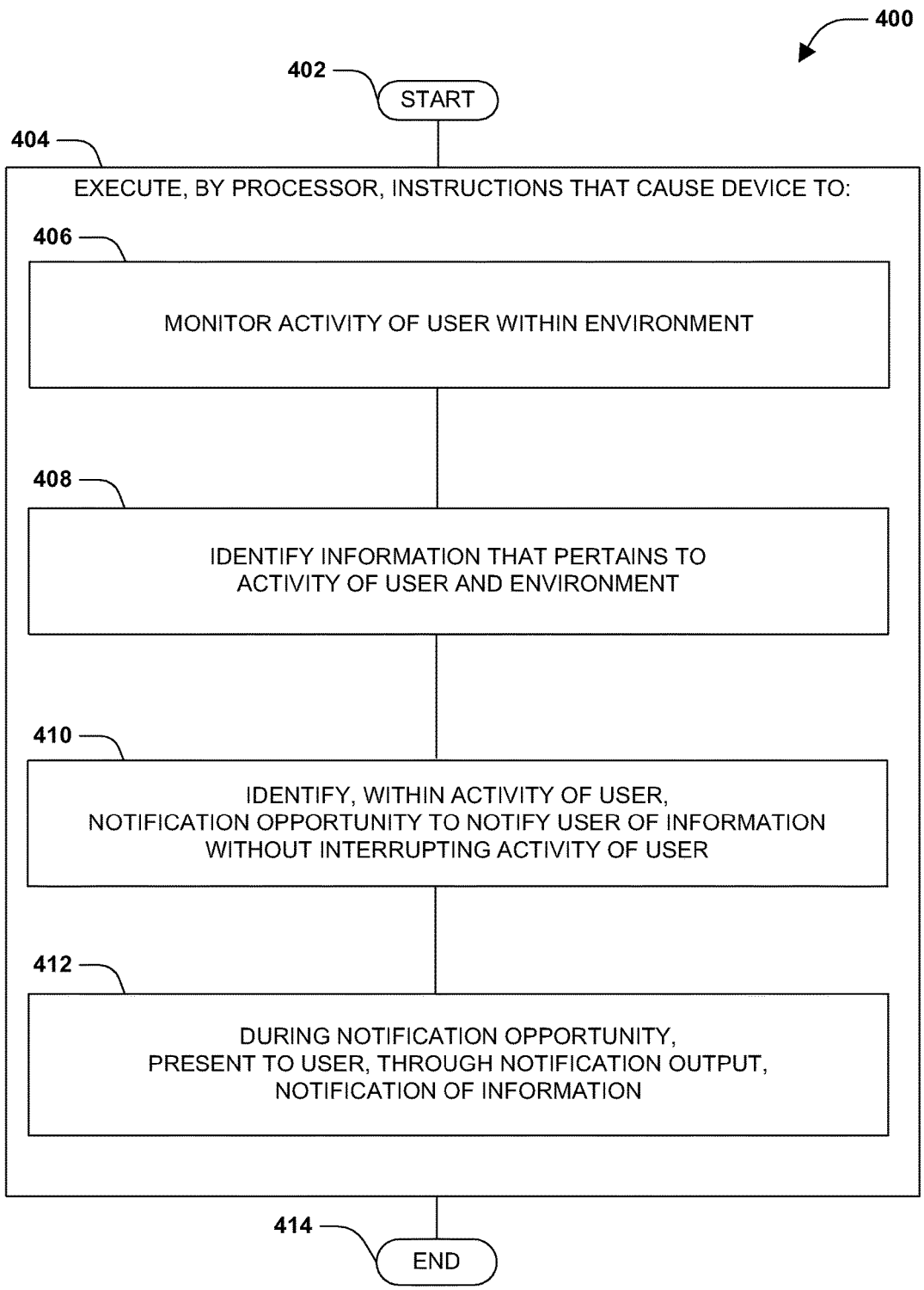
FIG. 4 is an illustration of an example method of presenting notifications to a user, in accordance with the techniques presented herein.

FIG. 4 is an illustration of an example method 400 of causing device 104 to notify a user 102 of information 310 in accordance with the techniques presented herein. The example method 400 involves a device 104 having a processor 308 and a notification output, and may be implemented, e.g., as a set of instructions stored in a memory 314 of the device 104, such as firmware, system memory, a hard disk drive, a solid-state storage component, or a magnetic or optical medium, wherein the execution of the instructions by the processor 308 causes the device 104 to perform in accordance with the techniques presented herein.

The example method 400 begins at 402 and involves executing 404 the instructions on the processor 308. In particular, executing 404 the instructions causes the device 104 to monitor 406 an activity 306 of the user 102 within the environment 304. Executing 404 the instructions causes the device 104 to identify 408 information 310 that pertains to the activity 306 of the user 102 within the environment 304. Executing 404 the instructions causes the device 104 to identify 410, within the activity 306 of the user 102, a notification opportunity 202 to notify the user 102 of the information 310 without interrupting the activity 306 of the user 102. Executing 404 the instructions causes the device 104 to, during the notification opportunity 202, present 412 to the user 102, through the notification output, a notification 114 of the information 310. Having achieved the notification 114 of the user 102 of the information 310, the example method 400 enables the device to present notifications 114 to the user 102 in an opportunistic manner in accordance with the techniques presented herein, and so ends at 414.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random-dom access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
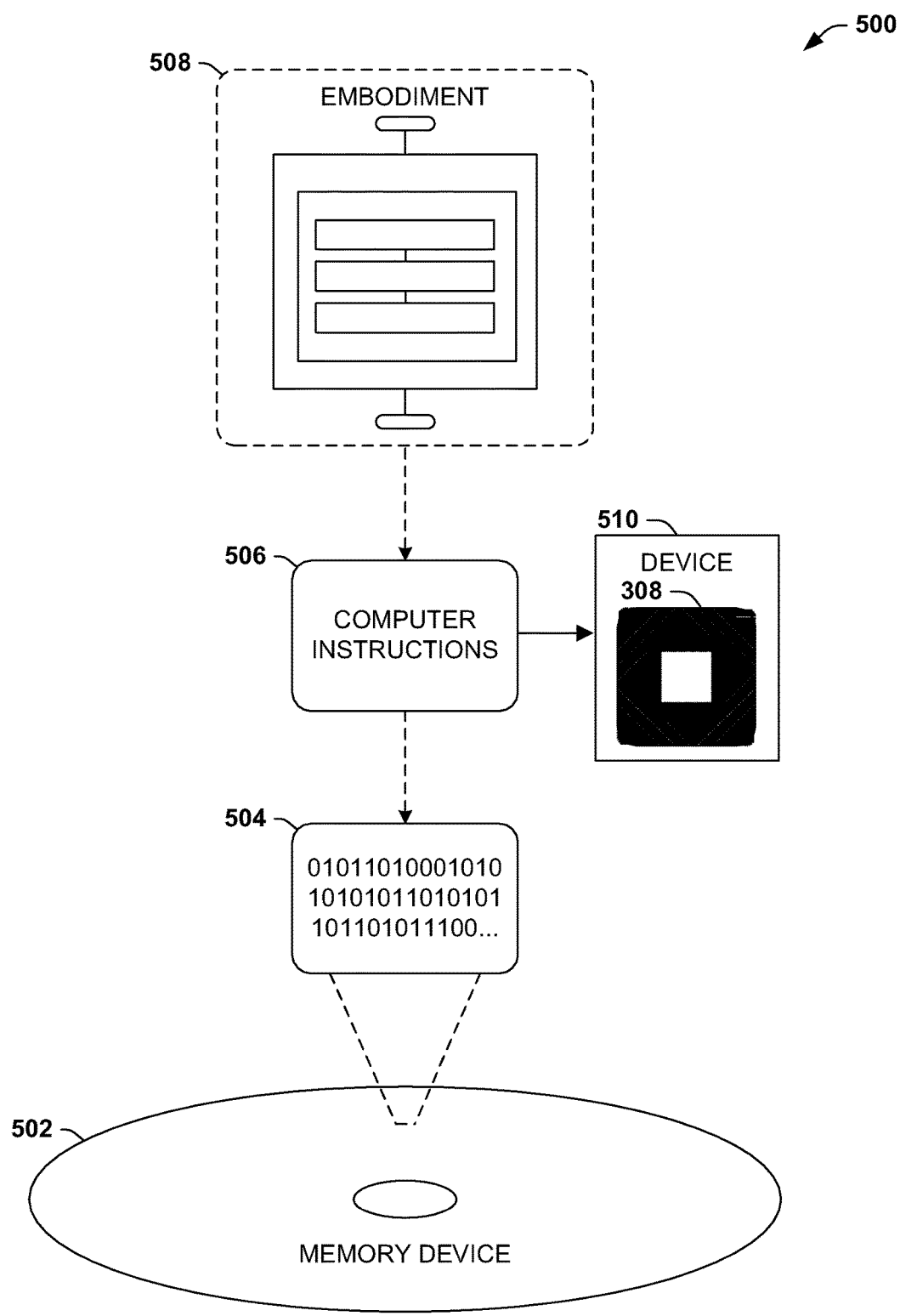
FIG. 5 is an illustration of an example computer-readable memory device that causes a device to present notifications to a user, in accordance with the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510, cause the device 510 to operate according to the principles set forth herein. For example, the processor-executable instructions 506 may cause a device to present notifications 114 of information 310 to a user 102 in an opportunistic manner, such as the example device 302 and/or the example system 316 of FIG. 3. As another example, execution of the processor-executable instructions 506 may cause a device 104 to perform a method of presenting notifications 114 of information 310 to a user 102 in an opportunistic manner, such as the example method 400 FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 302 of FIG. 3; the example system 316 of FIG. 3; the example method 400 of FIG. 4; and/or the example computer-readable memory device 500 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to produce many types of devices 104 that may present notifications 114 to a user 102. Such devices 104 include mobile devices, such as phones, tablets, and media players, and vehicle navigation systems, such as portable global positioning system (GPS) receivers and/or in-dash head units. Such devices 104 also include wearable devices, such as helmets, eyeglasses, headphones, headsets, earpieces, wristwatches, armbands, necklaces, bracelets, gloves, and footwear. The techniques may also be implemented across a set of devices 104, including devices 104 that are not collocated with the user 102. For example, the techniques presented herein may be implemented on a server that identifies the information 310 pertaining to the activity 306 of the user 102 in the environment 304, and that provides a notification 114 to a device 104 of the user 102. The device 104 of the user 102 may receive the notification 114 from the server; identify a notification opportunity 202 to present the notification 114 without interrupting the activity 306 of the user 102; and present the notification 114 during the notification opportunity 202. In this manner, a server and device may interoperate to notify the user 102 in an opportunistic manner in accordance with the techniques presented herein.

As a second variation of this first aspect, the techniques presented herein may be utilized with devices 104 comprising a variety of sensors that evaluate the actions of the user 102, such as cameras, microphones, accelerometers, gyroscopes, ambient sensors such as light level sensors, and global positioning system (GPS) receivers. Such sensors may also include wearable or embedded sensors of the user 102, such as a wristwatch that measures a pulse and/or blood pressure, and comprising a thermometer that measures a temperature of the user 102. Additionally, such devices 104 may comprise a variety of notification outputs that present notifications 114 to the user 102, such as displays, speakers, and haptic output components such as a vibration motors. The notification outputs may include components that transmit a notification to another device for output, such as a Bluetooth adapter that wirelessly transmits data to a Bluetooth speaker for output.

As a third variation of this first aspect, the techniques presented herein may be utilized to present notifications 114 of a variety of sources of information 310, such as appointments from the user's calendar or a shared calendar; email messages arriving in a user's mailbox; text messages, media messages, or incoming calls received by a user's phone; mapping databases that provide information about a location of the user 102; and contact databases that provide information about individuals 106 in the vicinity of and/or in communication with the user 102. Many such variations may be included in the types of devices 104 that utilize the techniques presented herein.

E2. Notification Opportunities

A second aspect that may vary among embodiments of the techniques presented herein involves the manner of identifying a notification opportunity 202 during which notifications 114 may be presented to the user 102.

As a first variation of this second aspect, the activity 306 may comprise a conversation 108 between the user 102 and another individual 106, and the notification opportunity 202 may be identified as a pause between speech of the user 102 and speech of the individual 106. For example, as illustrated in the example scenario 200 of FIG. 2, the exchange of expressions in the conversation 108 may be monitored to detect a period of silence, such as a period of at least ten seconds when neither the user 102 nor the individual 106 is detected as speaking, which may represent either a lull in the conversation 108 or an end of the conversation 108. One or more notifications 114 may be presented after waiting for ten seconds; even if the user 102 or the individual 106 begins speaking during the notifications 114, the notifications 114 presented at that time may be less likely to interrupt a sequence of expressions 110 forming a conversation 108. As a further example of this first variation, detected expressions 110 may be evaluated to determine whether the user 102 is engaged in the conversation 108, e.g., by comparing a voice detected by a microphone with a known voice of the user 102. If the conversation 108 does not appear to include the voice of the user 102, then notifications 114 may be presented even during the conversation 108, as the conversation 108 may be occurring near the user 102 but may not include the user 102. Similarly, if the detected volume of the conversation 108 is high, the conversation may be occurring near the user 102 and may therefore include the user 102, such that notifications 114 are to be withheld; but if the detected volume of the conversation 108 is low, the conversation may be among individuals who are quite a distance away from the user 102, such that notifications 114 may be freely presented to the user 102.

As a second variation of this second aspect, the notification opportunity 202 may be identified as an interval between the end of a current activity 306 of the user 102 and a start of a next activity of the user 102. For example, as presented in the example scenario 204 of FIG. 2, a calendar 118 of the user 102 may identify a set of classes 120, and an interval between the classes where the user 102 is idle, which may be identified as a notification opportunity 202 during which notifications 114 may be presented.

As a third variation of this second aspect, the notification opportunity 202 may be identified as a period during which the user 102 is interacting with the device 104. For example, if the user 102 is attending a social event or meeting and is interacting with other individuals 106, it may be desirable for the user's phone to withhold notifications 114; but if the user 102 takes a moment to interact with his or her phone, such interaction may be identified as a notification opportunity 202 during which notifications 114 may be presented.

FIG. 4 is an illustration of an example scenario featuring a fourth variation of this second aspect, wherein the activity 306 and/or notification opportunity 202 are identified according to a stress level of the user 102. In this example scenario, the device 104 comprises an accelerometer 602 that detects a series of impulses 604, and a global positioning system (GPS) receiver 606 that detects movement 608 of the device. According to the comparison 610 of such inputs, it may be possible to identify an activity 306 of the user 102, which may indicate the user's stress level and/or a notification opportunity 202. For example, in a first scenario 600, the accelometer 602 may detect a regular set of impulses 604 while the GPS receiver 606 detects movement in a consistent direction 608 and at a speed of about 9 km/h, which together may indicate that the user 102 is engaging in a jogging activity 306, which represents a physiological high-stress activity 306 that does not represent a notification opportunity 202. Accordingly, the device 104 may withhold notifications 114 during the activity 306, as the user 102 is less likely to receive, appreciate, and/or act upon notifications 114. In a second such scenario 612, the accelerometer 602 may detect no impulses 604 and the GPS receiver 606 may detect no movement 608, indicating that the user 102 is engaged in an idle sitting activity 306 that may represent a notification opportunity 202 during which notifications 114 may be presented to the user 102. Such physiological stress may also be detected, e.g., according to biometric devices, such as a wristwatch that detects a temperature, pulse, blood pressure, and/or oxygen saturation of the user 102, and notifications 114 may be presented only during notification opportunities 202 comprising an interval of time 124 during which the stress level exhibited by the user 102 remains below a stress level threshold.

As a fifth variation of this second aspect, in some instances, the information available to a device 104 may not clearly indicate whether or not the current time is a notification opportunity 202. Accordingly, the device 104 may ask the user 102 whether the user 102 is amenable to receiving notifications 114, and may identify a notification opportunity 202 only on condition of receiving from the user an assent to receive notifications 114. If the user 102 chooses not to respond to the query, the device 104 may presume that the present time 124 is not a notification opportunity 202 during which notifications 114 are to be presented.

As a sixth variation of this second aspect, some notifications 114 may represent time-sensitive information 310, such as an emergency call. The device 102 may therefore present such notifications 114 promptly and irrespective of the availability of a notification opportunity 202. Additionally, some notifications 114 may represent time-sensitive information 310 that is to be presented to the user 102 within a time period, such as information 310 that is to be presented to the user 102 within the next fifteen minutes. Rather than interrupting an activity 306 of the user 102, the device 104 may monitor the activity 306 of the user 102 within the environment 304 for the duration of the time period; and if a notification opportunity 202 arises during the time period, the notification 114 may be presented to the user 102. However, if no such notification opportunity 202 arises during the time period (e.g., the user is continuously busy for the time period), the notification 114 may then be presented to the user 102 to present the time-sensitive information 310, even if such presentation interrupts the activity 306 of the user 102. In some scenarios, the time-sensitivity and/or urgency of the information 310 may enable a selection of the time period to monitor for a notification opportunity 202 before interrupting the activity 306 of the user 102. Many such variations may be utilized to identify notification opportunities 202 during which notifications 114 may be presented in accordance with the techniques presented herein.

E3. Information and Notification Selection

A third aspect that may vary among embodiments of the techniques presented herein involves the types of notifications 114 that are selected for a particular notification opportunity 202. That is, the notification opportunity 202 may be identified according to the types of notifications 114 are available for presentation; and, conversely, notifications 202 may be selected for presentation during a notification opportunity 202 based upon various properties of the notification opportunity 202.

As a first variation of this third aspect, respective information items stored in a notification queue (i.e., information items for which notifications 114 are to be presented to the user 102) may be associated with an information priority, such as an urgency and/or time-sensitivity in which the respective notifications 114 are to be presented to the user 102. The device 104 may preferentially select, from the notification queue, enqueued information items having a highest information priority among the enqueued information items of the notification queue.

As a second variation of this third aspect, a device 104 may comprise a notification queue of information items that are to be presented to the user 102, such as reminders, messages, facts, and queries that may relate to various activities 306 and/or environments 304 of the user 102. When a notification opportunity 202 arises, the device 104 may select notifications 114 from the notification queue according to the properties of the notification opportunity 202. As a first such example, some information 310 in the notification queue may pertain to an activity 306 performed by the user 102, and the notification opportunity 202 may be identified in part by detecting an instance of the user 102 performing the activity 306. As a second such example, some information 310 in the notification queue may pertain to an individual 106, such as a contact of the user 102, and the notification opportunity 202 may be identified in part by detecting an encounter between the user 102 and the individual 106 (e.g., an in-person presence of the individual 106 near the user 102, or an interaction between the user 102 and the individual 106, including a remote interaction such as a phone call). Notably, such notification opportunities 202 may combine the occurrence of these conditions and other techniques presented herein; e.g., a notification 114 pertaining to an individual 106 may be presented during a notification opportunity 202 that is contingent upon both a conversation 108 between the user 102 and the individual 106, and also a period of silence in the conversation 108 with the individual 106, during which a notification 114 pertaining to the individual 106 may be presented to the user 102 with a lower likelihood of interrupting the conversation 108.

As a third variation of this third aspect, for a particular notification opportunity 202, a device 104 may select a batch of at least two notifications 114 of information items from the notification queue. The batch may comprise, e.g., notifications 114 of enqueued information items that are of a selected information item type. For example, a notification opportunity 202 may arise during which a particular notification 114 is to be presented, such as a reminder of an upcoming meeting identified by a calendar 118, and it may be advantageous for the device 104 to present other notifications 114 from the calendar 118 as a batch, rather than presenting one notification 114 of a reminder from a calendar 118 and one notification 114 of an incoming message 112. As another example, when the user 102 is performing a particular activity 306 during which a notification opportunity 202 arises that pertains to the activity 306, the device 104 may select for presentation, from the enqueued information items in the notification queue, at least two enqueued information items that relate to a current activity 306 of the user 102.

FIG. 7 is an illustration of a fourth variation of this third aspect, wherein notification opportunities 202 are identified based upon the activity 306 of the user 102 within the environment 304, and respective notifications 114 of information items in a notification queue 704 are selected for presentation based upon the activity 306 performed by the user 102. In a first such scenario 700, when the user 102 is engaged in a conversation 108 with an individual 106, the device 102 may preferentially select information that relates to the individual 106, and when a notification opportunity 202 arises within the conversation 108, the device 104 may present a notification 114 of the information pertaining to the individual 106 (e.g., a reminder to the user 102 that today is the individual's birthday). In a second such scenario 702, when the user 102 is idle 122 at a time 124 between classes, a notification opportunity 202 may be identified, and notifications 114 of information that particularly pertain to the user's academic interests may be preferentially selected over other notifications 114, such as messages from social networks or related to the user's hobbies or professional interests. If at least two such notifications 114 are available in the notification queue 704, a batch 706 of such notifications 114 may be presented together to the user 102. In this manner, the notifications 114 selected for presentation to the user 102 may be adapted based upon the nature of the notification opportunity 202 in accordance with the techniques presented herein.

As a fifth variation of this third aspect, the notification opportunity 114 may have a notification opportunity duration, such as a maximum amount of time between commitments (e.g., a ten-minute interval between classes), or a maximum amount of time that the user 102 typically engages the device 104 in receiving notifications 114. Respective enqueued information items may also comprise a notification duration, i.e., an amount of time that is involved in presenting the notification 114 to the user 102, and/or that the user 102 is likely to spend acting upon the notification 114, such as responding to an incoming message 112 by authoring a responsive message. Accordingly, when a particular notification opportunity 114 arises, a device 104 may project the notification opportunity duration, and select, from a set of enqueued information items in a notification queue 704, a batch 706 of at least two notifications 114 that present a combined notification duration that is within the notification opportunity duration.

Figure 8:
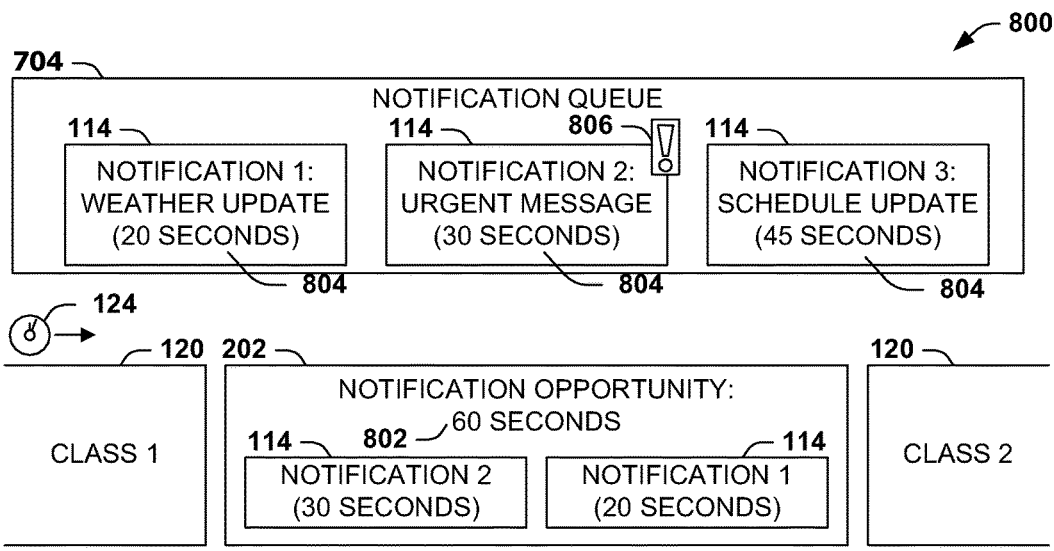
FIG. 8 is an illustration of a second example scenario featuring techniques for choosing among a set of notifications to present at a notification opportunity, in accordance with the techniques presented herein.

FIG. 8 is an illustration of an example scenario 800 featuring one such technique, in which a notification opportunity 114 arises between a set of classes 120. The notification opportunity 114 is identified as having a notification opportunity duration 802, such as a sixty-second interval of time 124 in which to present notifications 114. Additionally, notifications 114 stored in a notification queue 704 may be identified as having a notification duration 804, such as the amount of time involved in presenting the notifications 114 to the user 104 and/or the amount of time projected for the user 104 to act upon the respective notifications 114. Accordingly, a batch 706 of notifications 114 may be selected for presentation during this notification opportunity 114 with notification durations 804 that together fill, but do not exceed, the notification opportunity duration 802. For example, a notification 114 associated with a high information priority 806 may be preferentially selected that is projected to consume half of the sixty-second interval, and the remaining thirty seconds of the interval of time 124 in the notification opportunity 202 may be allocated to a second notification 114 with a projected notification duration 804 of twenty seconds, while a third notification 114 that does not fit within the notification opportunity duration 802 of the notification opportunity 202 is held for presentation during a subsequent notification opportunity 202. In this manner, various techniques may be utilized to select notifications 114 to be presented during a notification opportunity 202 in accordance with the techniques presented herein.

E4. Interactive Notifications

A fourth aspect that may vary among embodiments of the techniques presented herein involves the interactivity of some notifications 114. For example, a device 104 may distinguish between information 310 that is merely informative to the user 102, such as reminders of upcoming events, and information 310 that may prompt user input from the user 102, such as an incoming message 112 comprising an inquiry to which the user 102 may choose to respond, or a headline of a news item that the user 102 may interactively select options such as presenting the item now, skipping the item, saving the item for later consumption, or forwarding the item to another individual 106. Based upon such considerations, a device 104 may classify respective notifications 114 as interacting or non-interactive, and may adapt the techniques presented herein in accordance with such classification.

As a first variation of this fourth aspect, a notification opportunity 202 may also be classified according to a notification opportunity type set comprising an interactive notification opportunity (in which the user 102 is capable of providing user input to the device 104) and a non-interactive notification opportunity (in which the user 102 may be unable or unwilling to provide user input to the device 104). On condition of classifying the notification opportunity 202 as a non-interactive notification opportunity, the device 104 may exclude, from a batch 706 of notifications 202 presented to the user 102, interactive notifications 114 that are likely to involve user input of the user 102, and which may otherwise frustrate the user 102 if the user 102 is presently unable or unwilling to interact with the device 104 to provide user input.

As a second variation of this fourth aspect, the presentation of interactive notifications 202 may include a variety of interactive options for the user 102. As a first such example, the device 104 may present, with a notification 114, an offer to present additional information about the notification 114 (e.g., the device 104 may present a summary of a news story, and an offer to present a complete version of the news story). On condition of receiving from the user 102 an affirmative selection of an information item, the device 104 may present to the user 102, through the notification output, supplemental information about the information item. As a second such example, the device 104 may present a set of responsive options with a notification 114 for a particular interactive information item; e.g., if the notification 114 comprises an event invitation, the device 104 may offer the user 102 the options of accepting the invitation or declining the invitation, and may respond accordingly on condition of receiving user input from the user 102.

Figure 9:
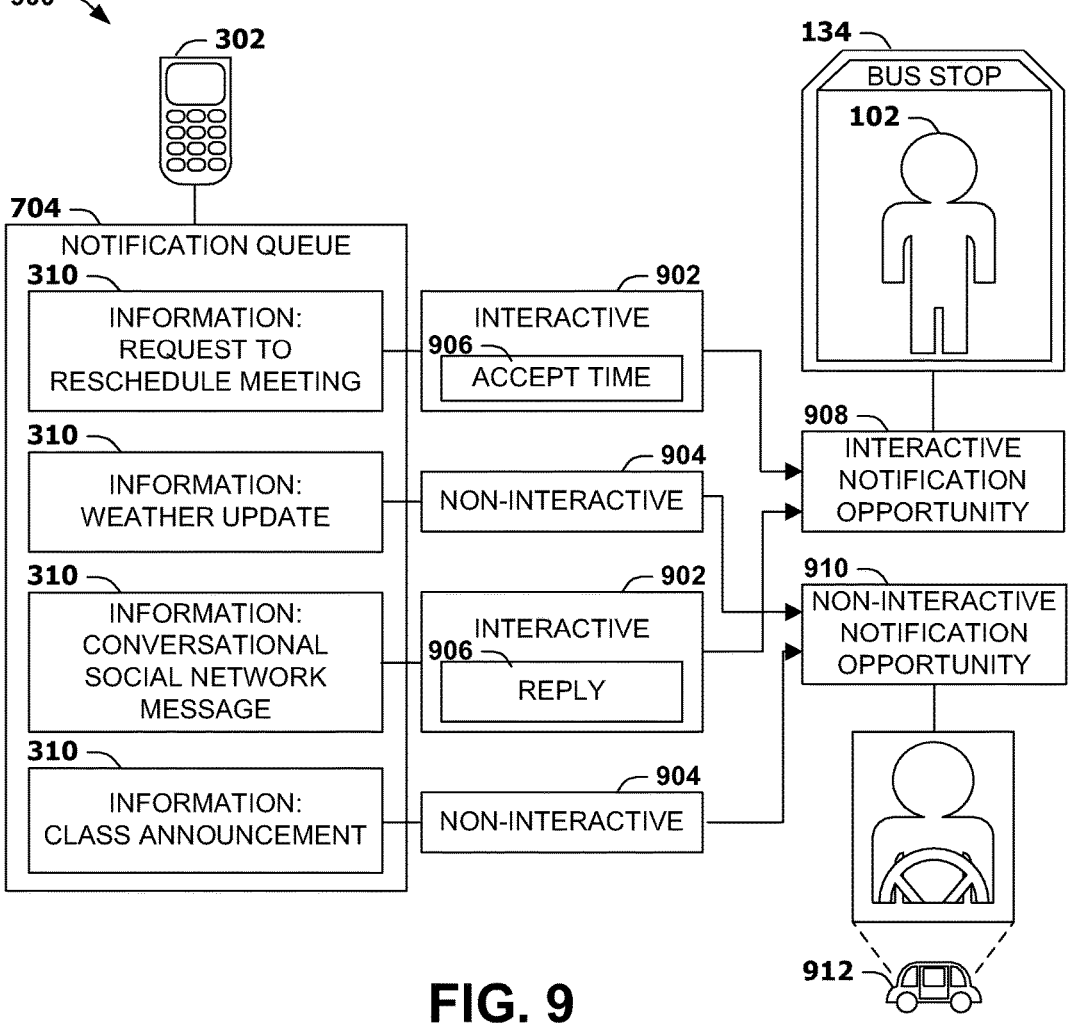
FIG. 9 is an illustration of a third example scenario featuring an example scenario featuring techniques for choosing among a set of notifications to present at a notification opportunity, in accordance with the techniques presented herein.

FIG. 9 is an illustration of an example scenario 900 in which a device 302 featuring a notification queue 704 of enqueued information 310 is to be presented to a user 102. The notifications 114 of the respective enqueued information 310 are classified as either an interactive notification 902 or a non-interactive notification 904 based on the content of the information 310; e.g., a request to reschedule a meeting or a conversational social network message may be classified as typically interactive notifications 902, while weather updates and class announcements may be classified as non-interactive notifications 904. Additionally, a first notification opportunity 202 of the user 102 is classified as an interactive notification opportunity 908 (e.g., the user 102 is awaiting at a bus stop 134 and is available to interact with the device 302), while a second notification opportunity 202 is classified as a non-interactive notification opportunity 910 during which the user 102 is not available to interact with the device 302 (e.g., while the user 102 is driving a vehicle 912). Accordingly, the notifications 114 of enqueued information 310 in the notification queue 704 may be selected for batches 704 that match the interactive and non-interactive classification of the notifications 902 with the interactive and non-interactive classification of the notification opportunities 202, e.g., by presenting interactive notifications 902 during the interactive notification opportunity 908, and presenting only non-interactive notifications 904 during the non-interactive notification opportunity 910. The interactive notifications 902 may include responsive options 906, such as accepting a proposed time for the rescheduled meeting and replying to the social network message. In this manner, the notifications 704 may be adapted for the availability of the user 102 to interact with the device 302 during the notification opportunity 202.

As a third such example, the device 104 may present to the user 102 options for adjusting the types of notifications 114 that are currently presented to the user 102 during the notification opportunity 202. For example, on condition of the user 102 requesting more of a particular notification type (e.g., asking for reminders of other appointments on a calendar 118), the device 104 may present additional notifications 114 during the notification opportunity 202 of the selected notification type. Conversely, on condition of receiving from the user 104 a refusal of a selected information item, the device 104 may refrain from presenting information items of the same information item type of the selected item (e.g., if the user declines to receive a notification 114 of a calendar appointment, the device 104 may refrain from presenting other notifications 114 of calendar appointments during this notification opportunity 202). Many such techniques may be provided to enable and respond to user input for interactive notifications 114 during notification opportunities 202 in accordance with the techniques presented herein.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that informs a user within an environment, comprising:
    a processor;
    a notification output; and
    a memory storing instructions that, when executed by the processor, cause the device to:
        monitor an activity of the user within the environment;
        identify the activity of the user within the environment;
        determine, within the activity of the user, an event that represents a notification opportunity to notify the user of the information without interrupting the activity of the user;
        detect, within the activity of the user, an instance of the event that represents the notification opportunity; and during the instance of the event, present to the user, through the notification output, a notification of the information.

2. The device of claim 1, wherein:
the activity of the user further comprises a conversation between the user and an individual; and
identifying the notification opportunity further comprises: during the conversation, identifying a pause between speech of the user and speech of the individual.

3. The device of claim 1, wherein monitoring the activity of the user further comprises:
comparing a voice detected by a microphone of the device with a voice of the user; and
based on the comparing, determining whether the user is engaged in a conversation with an individual.

4. The device of claim 1, wherein identifying the notification opportunity further comprises:
identifying an end of a current activity of the user; and
identifying an interval between the end of the current activity of the user and a start of a next activity of the user.

5. The device of claim 1, wherein identifying the notification opportunity further comprises: detecting that the user is interacting with the device.

6. The device of claim 1, wherein:
monitoring the activity of the user within the environment further comprises: evaluating a stress level of the user; and
identifying the notification opportunity further comprises: identifying an interval in which the stress level of the user is below a stress level threshold.

7. The device of claim 1, wherein:
the information further comprises time-sensitive information that is to be presented to the user within a time period; and
identifying the notification opportunity further comprises: responsive to failing to identify the notification opportunity within the time period for notifying the user of the information without interrupting the activity of the user, interrupting the user to present the time-sensitive information.

8. The device of claim 1, wherein
identifying the notification opportunity further comprises: detecting an instance of the user performing the activity.

9. The device of claim 1, wherein:
the information pertains to an individual; and
identifying the notification opportunity further comprises: detecting an encounter between the user and the individual.

10. A system that informs a user of a device comprising a processor and a notification output, the system comprising:
an activity monitor that monitors an activity of the user within an environment;
an information selector that identifies the activity of the user within the environment; and
an information notifier that:
determines, within the activity of the user, an event that represents a notification opportunity to notify the user of the information without interrupting the activity of the user;
detect, within the activity of the user, an instance of the event that represents a notification opportunity; and
during the instance of the event, presents to the user, through the notification output, a notification of the information.

11. The system of claim 10, wherein:
the information notifier further comprises a notification queue of information items to be presented to the user;
the information notifier further enqueues information items identified by the information selector; and
presenting the notification to the user further comprises: during the notification opportunity, presenting to the user a batch of at least two notification items from the notification queue.

12. The system of claim 11, wherein:
respective enqueued information items in the notification queue further comprises an information item type; and
presenting the batch further comprises: selecting, from the enqueued information items in the notification queue, at least two enqueued information items that are of a selected information item type.

13. The system of claim 11, wherein:
respective enqueued information items in the notification queue further relate to an activity performable by the user; and
presenting the batch further comprises: selecting, from the enqueued information items in the notification queue, at least two enqueued information items that relate to a current activity of the user.

14. The system of claim 11, wherein:
respective enqueued information items further comprise a notification duration; and
identifying the notification opportunity further comprises: projecting a notification opportunity duration; and
selecting, from the enqueued information items in the notification queue, a batch of at least two items that present a combined notification duration that is within the notification opportunity duration.

15. The system of claim 11, wherein:
at least some enqueued information items further involve user input of the user;
identify the notification opportunity further comprises: classifying the notification opportunity according to a notification opportunity type set comprising:
an interactive notification opportunity, and
a non-interactive notification opportunity; and
presenting the batch further comprises: on condition of classifying the notification opportunity as a non-interactive notification opportunity, excluding, from the batch, notifications of enqueued information items that further involve user input of the user.

16. The system of claim 11, wherein:
respective enqueued information items in the notification queue are further associated with an information priority; and
presenting the batch further comprises: selecting, from the enqueued information items in the notification queue, enqueued information items having a highest information priority among the enqueued information items of the notification queue.

17. A method of causing a device comprising a processor and a notification output to inform a user within an environment, the method comprising:
executing, by the processor, instructions that cause the device to:
monitor an activity of the user within the environment;
identify the activity of the user within the environment;
determine, within the activity of the user, an event that represents a notification opportunity to notify the user of the information without interrupting the activity of the user;
detect, within the activity of the user, an instance of the event that represents a notification opportunity; and during the event, present to the user, through the notification output, a notification of the information.

18. The method of claim 17, wherein identifying the notification opportunity further comprises:

asking the user whether the user is amenable to receiving the notification; and receiving from the user an assent to receive the notification.

19. The method of claim 17, wherein executing the instructions further causes the device to, on condition of receiving from the user an affirmative selection of an information item, present to the user, through the notification output, supplemental information about the information item.

20. The method of claim 17, wherein executing the instructions further causes the device to, on condition of receiving from the user a refusal of a selected information item, refrain from presenting information items of an information item type of the selected item.

* * * * *